US007660486B2

(12) United States Patent
Chang et al.

(10) Patent No.: US 7,660,486 B2
(45) Date of Patent: Feb. 9, 2010

(54) METHOD AND APPARATUS OF REMOVING OPAQUE AREA AS RESCALING AN IMAGE

(75) Inventors: Tsu-mu Chang, Shijr (TW); Cheng-hung Lee, Shijr (TW)

(73) Assignee: ATEN International Co., Ltd., Taipei (TW)

( * ) Notice: Subject to any disclaimer, the term of this patent is extended or adjusted under 35 U.S.C. 154(b) by 569 days.

(21) Appl. No.: 11/456,516

(22) Filed: Jul. 10, 2006

(65) Prior Publication Data

US 2008/0008402 A1 Jan. 10, 2008

(51) Int. Cl.
G06K 9/32 (2006.01)
G09G 5/00 (2006.01)
(52) U.S. Cl. .................. 382/298; 382/299; 382/300; 345/619; 345/660; 345/668; 345/670; 345/671; 348/580
(58) Field of Classification Search ......... 382/296–300; 345/600, 668, 670, 671; 348/580
See application file for complete search history.

(56) References Cited

U.S. PATENT DOCUMENTS

| 4,468,688 A | * | 8/1984 | Gabriel et al. ............. 348/580 |
| 4,988,984 A | | 1/1991 | Gonzalez-Lopez |
| 5,297,217 A | | 3/1994 | Hamilton, Jr. et al. |
| 5,384,869 A | * | 1/1995 | Wilkinson et al. .......... 382/240 |
| 5,448,372 A | * | 9/1995 | Axman et al. ............... 386/124 |
| 5,528,301 A | * | 6/1996 | Hau et al. .................... 348/441 |
| 5,574,572 A | * | 11/1996 | Malinowski et al. ........ 358/451 |
| 5,740,340 A | * | 4/1998 | Purcell et al. ............... 345/418 |
| 5,818,518 A | * | 10/1998 | Wordsworth et al. ........ 348/106 |
| 5,845,015 A | * | 12/1998 | Martucci ..................... 382/250 |
| 5,923,342 A | * | 7/1999 | Greenwood et al. ......... 345/520 |
| 6,072,834 A | * | 6/2000 | Kim et al. .................... 375/240 |
| 6,263,119 B1 | * | 7/2001 | Martucci ..................... 382/298 |
| 6,281,873 B1 | * | 8/2001 | Oakley ......................... 345/418 |
| 6,323,905 B1 | * | 11/2001 | Kondo et al. ................ 348/441 |
| 6,483,951 B1 | * | 11/2002 | Mendenhall et al. ........ 382/300 |
| 6,556,193 B1 | * | 4/2003 | Auld et al. ................... 345/418 |
| 6,563,511 B1 | * | 5/2003 | Yeh et al. ..................... 345/611 |

(Continued)

OTHER PUBLICATIONS

A. Ramaswamy, Y. Nijim, "Polyphase Implementation of a Video Scalar", Signals, Systems and Computers, Asilomar conference, Monterey, Calif., USA, pp. 1691-1694, vol. 2, 1997.*

*Primary Examiner*—Bhavesh M Mehta
*Assistant Examiner*—Gandhi Thirugnanam
(74) *Attorney, Agent, or Firm*—Patterson & Sheridan, LLP; Keith P. Taboada

(57) ABSTRACT

A method of resizing an image having a plurality of data unit blocks is disclosed. Each data unit block is a pixel matrix. The method includes the steps of generating column pseudo-pixel matrix corresponding to a data unit block, decimating/interpolating the data unit block in column direction to generate a scaled column-pixel matrix, filtering the scaled column-pixel matrix and the column pseudo-pixel matrix to generate a filtered column-pixel matrix, storing the filtered column-pixel matrix in a first buffer, generating a row pseudo-pixel matrix corresponding to the filtered column-pixel matrix stored in the first buffer, decimating/interpolating each the filtered column-pixel matrix to generate a scaled row-pixel matrix, and filtering the scaled row-pixel matrix and the row pseudo-pixel matrix to generate a resized row-pixel matrix.

15 Claims, 4 Drawing Sheets

U.S. PATENT DOCUMENTS

| | | | |
|---|---|---|---|
| 6,570,673 B2 * | 5/2003 | Kishimoto | 358/1.2 |
| 6,600,495 B1 * | 7/2003 | Boland et al. | 345/660 |
| 6,704,463 B1 | 3/2004 | Okada et al. | |
| 6,762,762 B2 * | 7/2004 | MacInnis et al. | 345/503 |
| 6,771,837 B1 | 8/2004 | Berbecel et al. | |
| 6,975,324 B1 * | 12/2005 | Valmiki et al. | 345/555 |
| 7,088,351 B2 * | 8/2006 | Wang | 345/204 |
| 7,091,944 B2 * | 8/2006 | Wang | 345/100 |
| 7,110,620 B2 * | 9/2006 | Shim et al. | 382/300 |
| 7,197,194 B1 * | 3/2007 | Ratcliffe | 382/298 |
| 7,554,553 B2 * | 6/2009 | MacInnis et al. | 345/589 |
| 2001/0019630 A1 * | 9/2001 | Johnson | 382/232 |
| 2004/0169660 A1 * | 9/2004 | MacInnis et al. | 345/601 |
| 2005/0093876 A1 * | 5/2005 | Snyder et al. | 345/582 |
| 2006/0077201 A1 * | 4/2006 | Shen | 345/213 |

* cited by examiner

METHOD AND APPARATUS OF REMOVING OPAQUE AREA AS RESCALING AN IMAGE

BACKGROUND OF THE INVENTION

1. Field of the Invention

The present invention relates to a method and apparatus for processing of digital images, more particularly to a method and apparatus for scaling a digital image.

2. Description of the Related Art

Digital signal processing of digital images is well known in the art. In digital image processing system, scaling or resizing an image is an important function. A conventional flat display provides various resolutions such as 640 pixels by 480 pixels, 800 pixels by 600 pixels, 1024 pixels by 768 pixels, 1280 pixels by 1024 pixels, while the amount of pixels is adjustable. Different scaling methods cause different clarity and contrast of image output. In traditional duplication and removal method, duplicating a pixel based on required scale produces an addition of pixels with identical intensity. However, by using such method, a saw edge of an image is shown as the image is enlarged by non-integrate times (e.g. 1.33 times) or a much higher enlargement, while a distortion of the image occurs as the image is shrunk. By contrast, another method using linear interpolation by which an addition of pixels is produced depending on location and intensity of adjacent pixels has a better image quality without an obvious saw edge of the scaled image. Such prior art methods are disclosed in U.S. Pat. No. 6,704,463, and references cited from S. Ramachandran, S. Srinivasan, "Design and FPGA Implementation of a Video Scalar with on-chip reduced memory utilization," dsd, p. 206, Euromicro Symposium on Digital Systems Design (DSD '03), 2003, and A. Ramaswamy, Y. Nijim, "Polyphase Implementation of a Video Scalar", Signals, Systems and Computers, Asilomar conference, Monterey, Calif., USA, pp. 1691-1694, Vol. 2, 1997, which hereby incorporated by reference. This invention presents a novel scheme to scale the image with filtering method in data unit block (DUB) and removing the opaque area generated during the filtering process.

SUMMARY OF THE INVENTION

It is an object of the present invention to provide an image scaling device and a scaling method that can be applied, for example, to resize the image for different displaying resolution.

Briefly summarized, the claimed invention provides a method of resizing an image comprising a plurality of data unit block (DUB) each having a pixel matrix, The method comprises the steps of generating column pseudo-pixel matrix corresponding to a data unit block, decimating/interpolating the data unit block in column direction to generate a scaled column-pixel matrix, filtering the scaled column-pixel matrix and the column pseudo-pixel matrix to generate a filtered column-pixel matrix, storing the filtered column-pixel matrix in a first buffer, generating a row pseudo-pixel matrix corresponding to the filtered column-pixel matrix stored in the first buffer, decimating/interpolating each the filtered column-pixel matrix to generate a scaled row-pixel matrix, and filtering the scaled row-pixel matrix and the row pseudo-pixel matrix to generate a resized row-pixel matrix.

According to the claimed invention, an image scaling device for resizing an image is disclosed. The image scaling device comprises a sample parameter generator for providing a column sampling parameter and a row sampling parameter, a column pseudo-pixel generator for generating a column pseudo-pixel matrix based on a data unit block from the plurality of data unit blocks, a column data sampler for decimating/interpolating the data unit block to generate a scaled column-pixel matrix, based on the column sampling parameter, a first filter for filtering the scaled column-pixel matrix and the column pseudo-pixel matrix to generate a filtered column-pixel matrix, a first buffer for temporarily storing the filtered column-pixel matrix, a row pseudo-pixel generator for generating a row pseudo-pixel matrix based on the filtered column-pixel matrix, a row data sampler for decimating/interpolating the filtered column-pixel matrix to generate a scaled row-pixel matrix based on the row sampling parameter, a second filter for filtering the scaled row-pixel matrix and the row pseudo-pixel matrix to generate a resized row-pixel matrix, and a second buffer for temporarily storing the resized row-pixel matrix.

The disclosed inventions will be described with reference to the accompanying drawings, which show important sample embodiments of the invention and which are incorporated in the specification hereof by reference.

DETAILED DESCRIPTION OF THE PREFERRED EMBODIMENT

Figure 1:
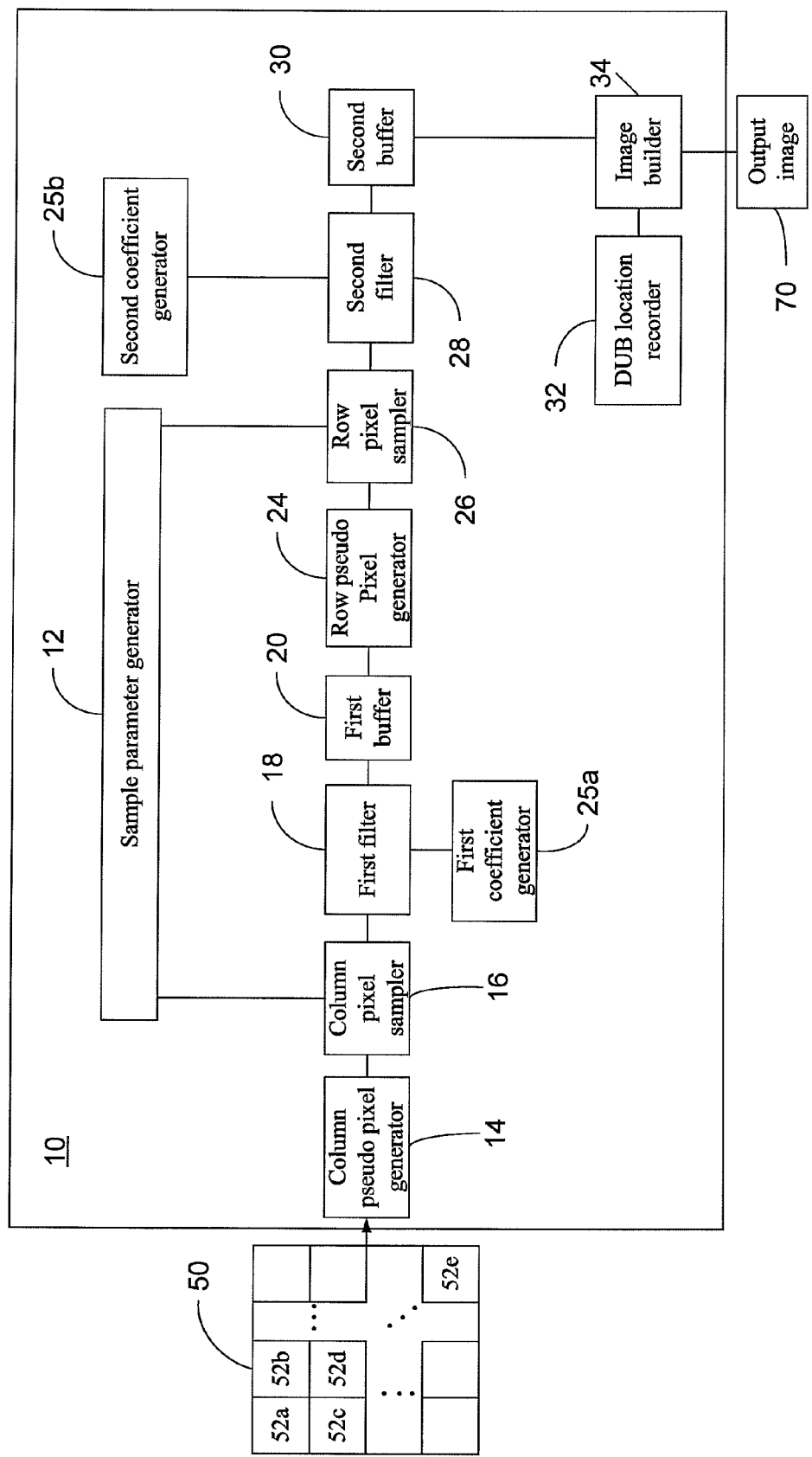
FIG. 1 illustrates a functional block diagram of the image scaling device according to the present invention.
Figure 2:
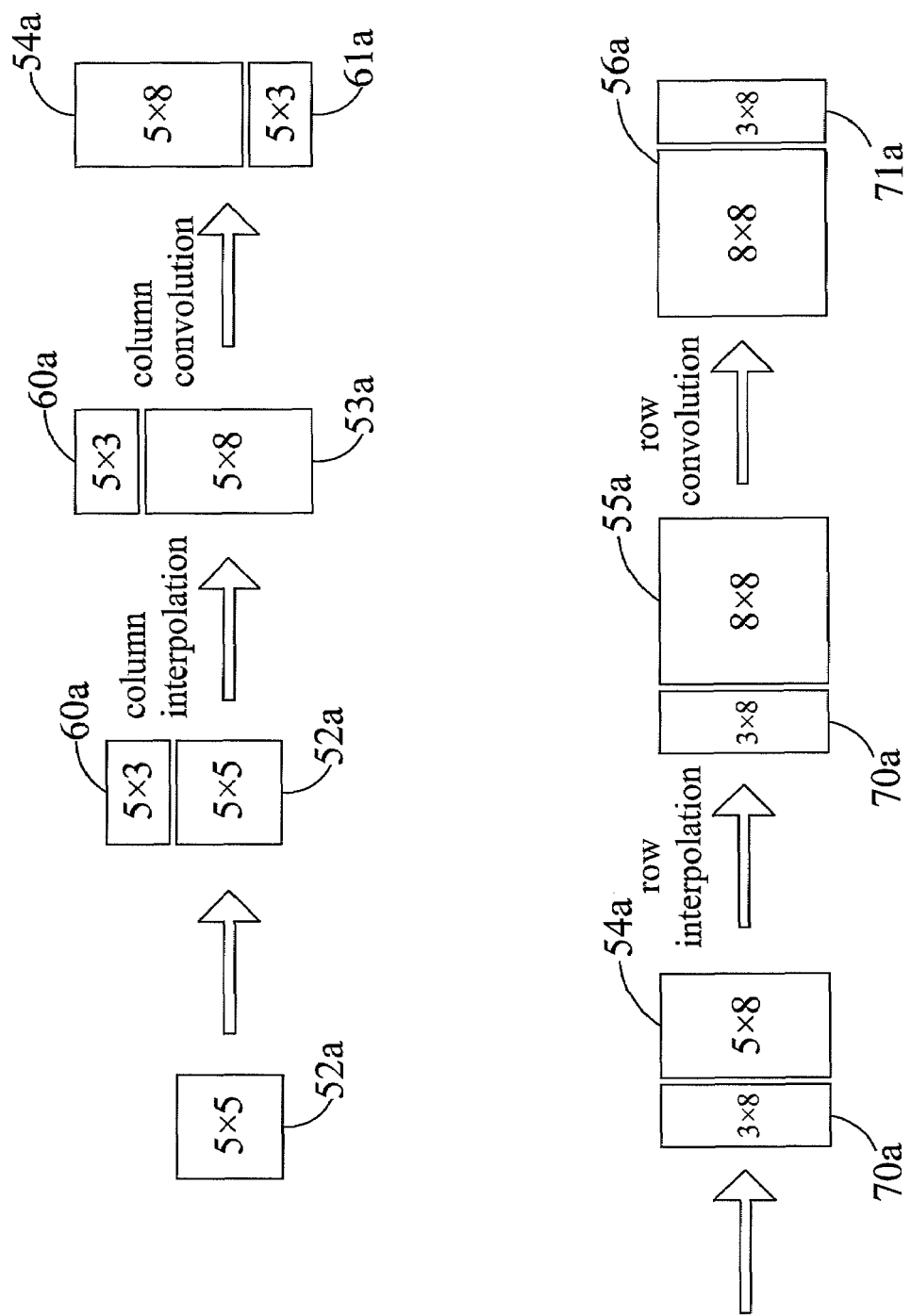
FIG. 2 shows an example of a process of determining a resized output pixel matrix corresponding to an original DUB of an input image.

Please refer to FIG. 1 and FIG. 2. FIG. 1 shows a functional block diagram of the image scaling device 10 according to the present invention, and FIG. 2 shows an example of a process determining a resized output pixel matrix corresponding to an original DUB of an input image. In this embodiment, the input image 50 is composed of a plurality of data unit blocks (DUB) 52 regarding as a pixel matrix. A DUB location recorder 32 can record the locations of the plurality of data unit blocks 52 associated with the input image 50. The image scaling device 10 includes a sample parameter generator 12 for providing a column sampling parameter and a row sampling parameter. For example, if scaling up original resolution with 640 by 480 pixels to a desired resolution with 1024 by 768 pixels is set, a row sampling parameter of 8/5 (1024/640) and a column sampling parameter of 8/5 (768/480) are obtained from the sample parameter 12. It should be appreciated that, in this embodiment, a data unit block with a 5×5 pixel matrix is used, yet an M×N pixel matrix where M and N are integrates is also selectable depending on the user's demand.

As receiving the DUB 52a, the column pseudo-pixel generator 14 generates column pseudo-pixel matrix 60a corresponding to the data unit block 52a. In this embodiment, the column pseudo-pixel generator 14 can duplicate, for example, the first three pixels in each column pixel of the DUB 52a to generate column pseudo-pixel matrix 60a. In other words, mapping the first three pixels in each column of the DUB 52a is performed to generate the column pseudo-pixel matrix 60a. Then, the column pseudo-pixel matrix 60a is output to the column data sampler 16.

The column data sampler 16 generates additional column pixels based on the column sampling parameter from the sample parameter generator 12. The column data sampler 16 interpolates three additional pixels for each column in response to the column sampling parameter of 8/5 to order to form the scaled column matrix 53a.

A filter coefficient generator 25a provides filter coefficients h1, h2, h3 to the first filter 18. The first filter 18 can filter the scaled column matrix 53a and the column pseudo-pixel matrix 60a by performing convolutions in columns for the scaled column matrix 53a and the column pseudo-pixel matrix 60a with the filter coefficients h1, h2, h3 to form the filtered column matrix 54a and the redundant column matrix 61a. Furthermore, the values of the three filter coefficients h1, h2, h3 can be adjusted depending on user's demand. Finally, the filtered column matrix 54a is stored in the first buffer 20, and the redundant column matrix 61a is removed.

A row pseudo-pixel generator 24 similar to the column pseudo-pixel generator 14 can generate a row pseudo-pixel matrix 70a corresponding to each row of the filtered column-pixel matrix 54a. In other words, the row pseudo-pixel generator 24 can duplicate by mapping, for example, the first three pixels in each row of the filtered column matrix 54a, to generate row pseudo-pixel matrix 70a.

Afterwards, the row data sampler 26 generates additional row pixels based on the row sampling parameter from the sample parameter generator 12. The row data sampler 26 interpolates three additional pixels for each row of the matrix 54a in response to the row sampling parameter of 8/5 in order to form the scaled row-pixel matrix 55a.

A second coefficient generator 25b provides filter coefficients v1, v2, v3 to the second filter 28. The second filter 28 can filter the row pseudo-pixel matrix 70a and the scaled row-pixel matrix 55a by performing row convolution for the row pseudo-pixel matrix 70a and the scaled row-pixel matrix 55a incorporating with the filter coefficients v1, v2, v3 to form the resized row-pixel matrix 56a and the filtered row pseudo-pixel matrix 71a. Furthermore, the values of the three filter coefficients v1, v2, v3 can be adjusted depending on user's demand. And the resized row pixel matrix 56a is stored in the second buffer 30, but the filtered row pseudo-pixel matrix 71a is removed.

As a result, the resized row-pixel matrix 56a is the output pixel matrix corresponding to the original DUB 52a of the input image 50. Moreover, the redundant column matrix 61a and the filtered row pseudo-pixel matrix 71a may be removed after resized row-pixel matrix 56a is determined.

Figure 3:
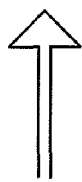
FIG. 3 shows an example of filtered column pixel matrixes corresponding to the original image.
Figure 3:

However, in addition to the DUB 52a of the input image 50, other DUBs can obtain their corresponding resized row-pixel matrix (i.e. output pixel matrix) by using similar mechanism, except the operation of the column pseudo-pixel generator and the row pseudo-pixel generator. Take DUB 52d as example, the DUB 52d is not positioned in the top or left edge of the image 50. The image scaling device 10 performs the plurality of DUBs of the input image 50 row by row. When the current DUB 52d prepares to be resized, as shown in FIG. 3, one previous processed DUB 52b adjacent to the DUB 52d, and a filtered column pixel matrix 54c of previous processed DUB 52c are read. And the column pseudo-pixel generator 14 gathers the last three pixels of each column of the previous processed DUB 52b as the column pseudo-pixel matrix, rather than to duplicate the first three pixel of each column of the DUB 52d. In other words, if the current DUB follows at top side a processed DUB of the current DUB, the column pseudo-pixel generator utilizes the last three pixels of each column of the previous processed DUB at top side of the current DUB as the column pseudo-pixel matrix, instead of mapping the first three pixel of each column of the current DUB. Then, the row pseudo-pixel generator 24 gathers the last three pixels of each row of the filtered column matrix 54c of the previous processed DUB 52c as the row pseudo-pixel matrix, rather than to duplicate the first three pixel of each row of the filtered column pixel matrix.

Although the present invention has been explained by the embodiments shown in the drawings described above, it should be understood to the ordinary skilled person in the art that the invention is not limited to the embodiments. For example, the number of the filter coefficients used depends on the design demand, and two or more filter coefficients are also allowed.

As long as the input image 50 determines corresponding resized output pixel matrixes for all DUBS, an image builder 34 can recombine the output matrixes stored in the second buffer 30 as a new resized output image 70 based on the DUB locations of DUBs stored in the DUB location recorder 32.

It should be appreciated that the process of determining the resized output matrix illustrated above is performed in pipeline mode well known in the art.

Figure 4:
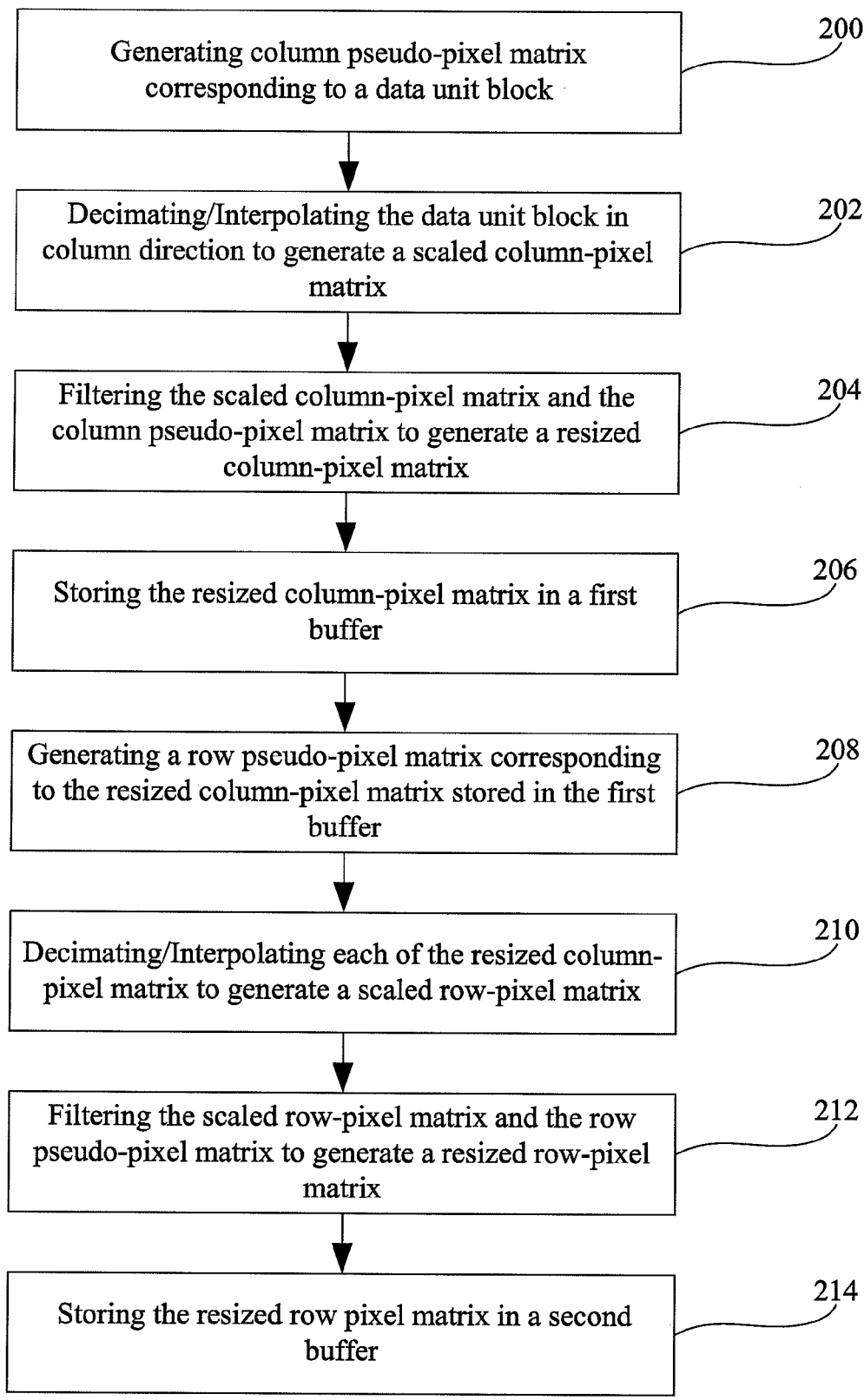
FIG. 4 is a flowchart of the image scaling method according to the present invention.

Please refer to FIG. 4, which is a flowchart of the image scaling method according to the present invention. The method comprises the steps of:

Step 200: Generating a column pseudo-pixel matrix corresponding to a data unit block.
Step 202: Decimating/interpolating the data unit block in column direction to generate a scaled column-pixel matrix.
Step 204: Filtering the scaled column-pixel matrix and the column pseudo-pixel matrix to generate a filtered column-pixel matrix.
Step 206: Storing the filtered column-pixel matrix in a first buffer.
Step 208: Generating a row pseudo-pixel matrix based on the filtered column-pixel matrix stored in the first buffer.
Step 210: Decimating/interpolating the filtered column-pixel matrix to generate a scaled row-pixel matrix.
Step 212: Filtering the scaled row-pixel matrix and the row pseudo-pixel matrix to generate a resized row-pixel matrix.
Step 214: Storing the resized row-pixel matrix in a second buffer.

It should be noted that, if the current DUB follows at top side a processed DUB of the current DUB, Step 200 is realized by utilizing the last three pixels of each column of the previous processed DUB at top side of the current DUB as the column pseudo-pixel matrix, otherwise, by mapping the first three pixels of each column of the current DUB. Furthermore, if the current DUB follows at left side a processed DUB of the current DUB, Step 208 is realized by utilizing the last three pixels of each row of the filtered column-pixel matrix of the previous processed DUB at left side of the current DUB as the row pseudo-pixel matrix, otherwise, by mapping the first three pixels of each row of the filtered column pixel matrix.

To sum up, the image scaling device 10 decomposes the input image 50 as a plurality of data unit blocks. Then the image scaling device 10 processes each data unit block row by row and each data unit block to be scaled up/down in columns first and then scaled up/down in rows afterward. Compared with other methods that the image scaling device 10 processes each data unit block row by row, and each data unit block to be scaled up/down in rows first and then scaled up/down in columns afterward, or the image scaling device 10 processes each data unit block column by column, and each data unit block to be scaled up/down in columns first and then scaled up/down in rows, such method utilizes a minimum memory.

In contrast to prior art, the present invention image scaling device can generate an output image which maintains desired color contrast and clarity according to an adjustment of image resolution. In addition, because the pixels at the sides of the input image are mapped as reference pixels (named as pseudo-pixel matrixes above) and are considered, the pixels at the sides of the output image have smoother pixel values, rather than opaque values. In this way, the present inventive mechanism can avoid traditional opaque pixels at the sides of the output image. Moreover, by using pipeline design in hardware, the present invention can speed up in processing image and thus shorten time in determining each resized output pixel matrix corresponding to the data unit blocks of the input image.

The present invention has been described with references to certain preferred and alternative embodiments which are intended to be exemplary only and not limited to the full scope of the present invention as set forth in the appended claims.

What is claimed is:

1. A method of resizing an image comprising a plurality of data unit blocks (DUB) each being a pixel matrix, the method comprising:
    generating a column pseudo-pixel matrix corresponding to a data unit block;
    decimating or interpolating the data unit block in column direction to generate a scaled column-pixel matrix;
    filtering the scaled column-pixel matrix and the column pseudo-pixel matrix to generate a filtered column-pixel matrix and a redundant column matrix respectively;
    storing the filtered column-pixel matrix in a first buffer;
    generating a row-pseudo-pixel matrix based on the filtered column-pixel matrix stored in the first buffer;
    decimating or interpolating the filtered column-pixel matrix to generate a scaled row-pixel matrix; and
    filtering the scaled row-pixel matrix and the row pseudo-pixel matrix to generate a resized row-pixel matrix and a filtered row pseudo-pixel matrix respectively, wherein the above steps are computed by a processor.

2. The method of claim 1, wherein the step of generating the column pseudo-pixel matrix corresponding to a data unit block is performed by mapping a gist predetermined number of pixels form each column of the data unit block.

3. The method of claim 1, wherein the step of generating the row pseudo-pixel matrix is performed by mapping a predetermined number of pixels from each row of the scaled column-pixel matrix.

4. The method of claim 1, wherein the step of generating the column pseudo-pixel matrix is performed by reading a predetermined number of pixels from each column of a previous data unit block corresponding to the current data unit block.

5. The method of claim 1 wherein the step of generating the row pseudo-pixel matrix is performed by reading a predetermined number of pixels from each row of a filtered column-pixel matrix of a previous data unit block.

6. The method of claim 1 wherein the step of filtering the scaled column-pixel matrix and the column pseudo-pixel matrix is performed by convolving the scaled column-pixel matrix and the column pseudo-pixel matrix with at least one predefined filter coefficient generated from a first filter coefficient generator.

7. The method of claim 6 wherein the step of filtering the scaled row-pixel matrix and the row pseudo-pixel matrix is performed by convolving the scaled row-pixel matrix and the row pseudo-pixel matrix with the at least one predefined filter coefficient generated from a second filter coefficient generator.

8. An image scaling device for resizing an image comprising a plurality of data unit blocks (DUB) each having a pixel matrix, comprising:
    a sample parameter generator for providing a column sampling parameter and a row sampling parameter;
    a column pseudo-pixel generator for generating a column pseudo-pixel matrix based on a data unit block from the plurality of data unit blocks;
    a column data sampler for decimating or interpolating the data unit block to generate a scaled column-pixel matrix, based on the column sampling parameter;
    a first filter for filtering the scaled column-pixel matrix and the column pseudo-pixel matrix to generate a filtered column-pixel matrix and a redundant column matrix respectively;
    a first buffer for temporarily storing the filtered column-pixel matrix;
    a row pseudo-pixel generator for generating a row pseudo-pixel matrix based on the filtered column-pixel matrix;
    a row data sampler for decimating or interpolating the filtered column-pixel matrix to generate a scaled row-pixel matrix based on the row sampling parameter;
    a second filter for filtering the scaled row-pixel matrix and the row pseudo-pixel matrix to generate a resized row-pixel matrix and a filtered row pseudo-pixel matrix respectively; and
    a second buffer for temporarily storing the resized row-pixel matrix.

9. The image scaling device of claim 8 further comprising:
    a filter coefficient generator for providing at least one filter coefficient.

10. The image scaling device of claim 9 further comprising:
    a calculation unit for convolving the scaled column-pixel matrix and the column pseudo-pixel matrix with at least one predefined filter coefficient, and for convolving the scaled row-pixel matrix and the row pseudo-pixel matrix with the at least one predefined filter coefficient.

11. The image scaling device of claim 8 wherein the column pseudo-pixel generator is a column duplicating device for mapping a predetermined number of pixels from each column of the data unit block to generate the column pseudo-pixel matrix.

12. The image scaling device of claim 8 wherein the row pseudo-pixel generator is a row duplicating device for mapping a predetermined number of pixels from each row of the filtered column-pixel matrix to generate the row pseudo-pixel matrix.

13. The image scaling device of claim 8 wherein the column pseudo-pixel generator utilizes a predetermined number of pixels from each column of a previous data unit block corresponding to the current data unit block as the column pseudo-pixel matrix.

14. The image scaling device of claim 8 wherein row pseudo-pixel generator utilizes a predetermined number of pixels from each row of a filtered column-pixel matrix of a previous data unit block as the row pseudo-pixel matrix.

15. The image scaling device of claim 8, further comprising:
    a DUB location recorder for recording each location with regard to each data unit block of the image; and
    an image builder for constructing an output image based on the resized row-pixel matrix and the location of each data unit block from the DUB location recorder.

* * * * *